US009603171B2

(12) United States Patent
Luft et al.

(10) Patent No.: US 9,603,171 B2
(45) Date of Patent: Mar. 21, 2017

(54) CONTACT INFORMATION MANAGEMENT METHODS AND APPARATUS

(75) Inventors: Achim Luft, Braunschweig (DE); Maik Bienas, Braunschweig (DE)

(73) Assignee: Apple Inc., Cupertino, CA (US)

( * ) Notice: Subject to any disclaimer, the term of this patent is extended or adjusted under 35 U.S.C. 154(b) by 1025 days.

(21) Appl. No.: 12/635,470

(22) Filed: Dec. 10, 2009

(65) Prior Publication Data

US 2011/0143713 A1 Jun. 16, 2011

(51) Int. Cl.
| | |
|---|---|
| *H04M 1/66* | (2006.01) |
| *H04W 76/02* | (2009.01) |
| *H04L 29/06* | (2006.01) |
| *H04M 3/56* | (2006.01) |

(52) U.S. Cl.
CPC ............ *H04W 76/02* (2013.01); *H04L 63/04* (2013.01); *H04L 63/102* (2013.01); *H04M 3/56* (2013.01)

(58) Field of Classification Search
CPC G06Q 50/01; G07F 7/08; H04L 29/06; H04L 67/14; H04L 12/58; H04L 12/581; H04L 12/587; H04L 51/04; H04L 51/24; H04L 65/1069; H04L 65/1083; H04L 51/38; H04L 63/04; H04L 63/102; H04L 9/3247; H04M 3/42; H04M 3/42059; H04M 3/42365; H04M 3/42374; H04M 7/006; H04M 2250/06; H04W 76/02; H04W 92/18; G06F 21/31
USPC ............. 455/410, 411, 414.1, 414.2, 414.3; 705/50, 14.64; 713/168, 169, 170
See application file for complete search history.

(56) References Cited

U.S. PATENT DOCUMENTS

| | | | |
|---|---|---|---|
| 7,389,324 B2 * | 6/2008 | Masonis et al. | 709/206 |
| 7,685,236 B1 * | 3/2010 | Harik et al. | 709/205 |
| 7,716,124 B2 | 5/2010 | Rivest et al. | |
| 8,069,166 B2 * | 11/2011 | Alvarado et al. | 707/722 |
| 2006/0015519 A1 * | 1/2006 | LaBrosse | 707/101 |
| 2006/0156022 A1 * | 7/2006 | Grim et al. | 713/182 |
| 2007/0266118 A1 * | 11/2007 | Wilkins | 709/219 |
| 2009/0106123 A1 | 4/2009 | Foran et al. | |
| 2009/0202053 A1 * | 8/2009 | Zehnbacht et al. | 379/93.12 |
| 2009/0265794 A1 * | 10/2009 | Apelqvist | 726/30 |
| 2010/0005059 A1 * | 1/2010 | Banerjee | G06Q 10/109 707/E17.001 |
| 2010/0015955 A1 * | 1/2010 | Backlund et al. | 455/414.1 |
| 2010/0076926 A1 * | 3/2010 | Lecciso et al. | 707/610 |
| 2010/0144318 A1 * | 6/2010 | Cable | 455/412.1 |

(Continued)

*Primary Examiner* — Michael Faragalla
*Assistant Examiner* — Gerald Oliver
(74) *Attorney, Agent, or Firm* — Gazdzinski & Associates, PC

(57) ABSTRACT

Methods and apparatus for controlled and/or secure distribution of contact information. In one embodiment, transfers of contact information must be authorized by the affected party. The party distributing the contact data, the party receiving the contact data, and the party described by the contact data initiate a secure dialog to exchange contact data. Various embodiments also enable piecemeal authorization and transfer of contact information, allowing the affected party to control the portion of contact data transferred, as well as apply specific rule sets or templates. In one variant, the authorization and transfer process is optimized to reduce the number of transaction steps. Additionally, solutions for distributing contact information among larger groups of participants are also disclosed.

19 Claims, 7 Drawing Sheets

(56) References Cited

U.S. PATENT DOCUMENTS

2010/0287244 A1* 11/2010 Wicks et al. .................. 709/206
2011/0154037 A1*  6/2011 Orre et al. .................... 713/168

* cited by examiner

```
<?xml version="1.0"?>
    <vCard:FN> James Bond </vCard:FN>
    <vCard:Family>  Bond </vCard:Family>
    <vCard:Given> James </vCard:Given>
    <vCard:Other> 007 </vCard:Other>
    <vCard:Prefix> Sir </vCard:Prefix>
    <vCard:BDAY> 1920-11-11 </vCard:BDAY>
    <vCard:TITLE> Commander </vCard:TITLE>
    <vCard:ROLE> Secret Agent </vCard:ROLE>

<vCard:TEL TYPE=WORK> 123-456-7890 </vCard:TEL>
    <vCard:TEL TYPE=HOME> 123-456-7890 </vCard:TEL>
    <vCard:TEL TYPE=CELL> 123-456-7890 </vCard:TEL>
    <vCard:EMAIL TYPE=WORK> james.bond@secret.service.gov
</vCard:EMAIL>
    <vCard:EMAIL TYPE=HOME> agent007@mi6.org </vCard:EMAIL>

<vCard:ADR>
      <vCard:Street>    54 Broadway </vCard:Street>
      <vCard:Locality> London </vCard:Locality>
      <vCard:Pcode>    SW1 </vCard:Pcode>
      <vCard:Country>  United Kingdom </vCard:Country>
    </vCard:ADR>
```

FIG. 1

CONTACT INFORMATION MANAGEMENT METHODS AND APPARATUS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of data transfer. More particularly, in one exemplary aspect, the present invention is directed to methods and apparatus for contact information transfer among wireless devices.

2. Description of Related Technology

Communications products and services (e.g., phone, email, internet-based social networking, etc.) continue to expand and evolve. This rapid expansion of new communication modalities also drives the related growth of new user identity mechanisms. Many people now maintain home, work, fax and mobile phone numbers, several email addresses, and a myriad of social networking accounts (e.g., instant messenger or IM handles, Facebook™ and Twitter™ profiles, etc.). Each of these systems may have different protocols, message flows and addressing schemata designed around their wholly (or incrementally) different system functionalities.

Previous systems attempted to consolidate and reduce user identities across systems; thus, a person used (or reused) a single user identity for different communication modalities. Yet other approaches provided cursory translations from a first service to other services using proxy user identities; for example, certain prior art gateways routed VoIP calls (Voice over Internet Protocol) to PLMN networks (Public Land Mobile Network). Similarly, other prior art solutions could convert SMS (Short Messaging Service) text messages into voice messages and route them to voice-only phones.

Most recently, however, growing concerns over privacy, and desires for anonymity, have overridden convenience. Moreover, instead of users actively minimizing their user identity footprint, it is now more common for people to maintain multiple user identities, and control the diffusion of these identities. For example, many people prefer to maintain a number of work-specific identities for professional and work acquaintances; and separate personal identities for personal communications. Thus, the contact information provided to a co-worker or business associate generally differs from contact information shared among friends.

Unfortunately, the history of consolidation and separation of user identities has created a virtual labyrinth of intertwining contact identities; any single person might have a web of interconnecting and reconnecting user identities, distributed to coworkers, family members, friends, etc. Additionally, coworkers become friends, friends become coworkers, contacts go in and out of touch, new accounts or phones are purchased, etc. Appreciably, the task of identity management (i.e., controlling the distribution of contact information) is rapidly changing, and has become virtually unmanageable, especially for persons simultaneously using or subscribing to many of the various different modalities previously described.

Address books, in an electronic form, are digital equivalents to their paper-based progenitors. Electronic address books are databases that are used for storing entries that are now colloquially known by users as "contacts". The information stored in these contact entries ("contact information") may include without limitation: (i) names; (ii) pictures or avatars associated with the names; (iii) various phone numbers (i.e., home, work, cellular, etc.); (iv) e-mail addresses (e.g., both personal and work-related); (v) fax numbers; (vi) user names or profiles associated with various services (i.e., instant messaging applications, Facebook™, Twitter™, etc.); and (vii) various other related information associated with a user (i.e., birthdays, favorite things, names of related family members, anniversary dates, information on how met or introduced, actual physical addresses of their residence or work, etc.). Hence, the term "address book" is somewhat under-inclusive of all the information that might be contained therein. Accordingly, in the present context, the term "address book" shall be used refer without limitation to any listing of contact and/or other information relating to one or more individuals or entities.

Advanced implementations of electronic address books widely vary in capabilities and features. Many electronic address books can transfer contact information from one device to another. For example, a mobile phone may use a short-range wireless modem to transmit contact information to another mobile device, such as via the well-known Bluetooth protocol. In another example, a laptop may use a wireline or WLAN connection to access a central database containing directory information to retrieve user-specific information data.

Unfortunately, prior art solutions for transferring contact information between devices suffer from several drawbacks. Firstly, the distribution of contact information is poorly controlled; i.e., a first person often has no control (or an unacceptable level of control) over the use and distribution of his contact information by other users. For example, consider the following scenario, "Andrew" provides his contact information to "Bob"; shortly thereafter, Bob shares the contact information with "Cameron" because Cameron is interviewing Andrew for a job. Andrew is unaware that Cameron has his contact information, and posts unflattering information on his website. Andrew may have been under the impression that Bob would not share his personal information with his interviewer Cameron. For his part, Bob may have shared Andrew's contact information to help Cameron contact Andrew (i.e., Bob was unaware that Andrew's personal information was sensitive). This scenario illustrates how even accidental uncontrolled contact information transfers can be disastrous. Clearly, intentionally malicious or surreptitious activities could be even more problematic.

Secondly, systems which require painstaking effort to verify that each entry of contact information is authorized for transfer may be unrealistic. A person's contact information may be composed of a large number of entries; each entry may have different degrees of privacy, importance, rules of use/distribution, etc. For large transfers, the resulting authorization traffic is extremely burdensome for all entities involved (e.g., the transfer and requesting agents, the networks, etc.).

Also, prior art solutions lack a cohesive organization, Generally, contact information is stored in a hodge-podge manner, based on individual service type, different application programs, user profile databases, etc. For example, contact information stored in application specific databases is usually restricted from access by other programs. Consequently, information can (or must) be replicated many times in many programs. Furthermore, human error and apathy, can lead to spotty updating of contact information, and/or incorrect or inconsistent information across different applications.

Based on the foregoing, improved methods and apparatus are needed for improving the transfer and management of contact information between different devices and/or environments. Such improved methods and apparatus should ideally leverage existing hardware and software as much as possible, so as to facilitate their implementation on existing ("legacy") devices, as well as minimize deployment costs from both the network side and mobile device perspective. They should also ideally provide, inter alia, capabilities for managing the distribution of contact information, thereby providing users with greater control over their identity "footprint".

SUMMARY OF THE INVENTION

The present invention satisfies the foregoing needs by providing, inter alia, methods and apparatus for contact information management and distribution.

In a first aspect of the invention, a method for transmitting the contact information of a first party to a second party is disclosed. In one embodiment, the transmission is performed using a contact management device, and the method includes: contacting the first party with a data transmission request using the contact management device; receiving authorization from the first party for the data transmission request; authenticating the first party using at least in part the received authorization; and transmitting the contact information of the first party to the second party.

In one variant, transmitting of the contact information is performed substantially in response to the acts of receiving and authenticating.

In another variant, the contact management device includes a network-based server.

Alternatively, the contact management device includes a portable device associated with the user, and has a client application and a cellular air interface (e.g., UMTS, LTE, LTE-A, GSM, etc.)

In a further variant, at least the acts of receiving, authenticating, and transmitting of the contact information are performed substantially automatically.

In a second aspect of the invention, a computer readable apparatus is disclosed. In one embodiment, the apparatus has a storage medium with at least one computer program stored thereon, the at least one computer program comprising a plurality of computer executable instructions that, when executed by a processor: process a received data transmission request from a first party, the received data transmission request seeking permission to transmit a user's contact information to a second party; and transmit an authorization message to the first party, the authorization message allowing the first party to transmit the user's contact information to at least the second party.

In one variant, the authorization message includes a digital signature used to authenticate the user.

In another variant, the user's contact information is associated with a third party, who is neither the first party nor the second party.

In yet another variant, at least one of the request and the authorization message comprise an extensible markup language (XML)-based message.

In a further variant, the authorization message includes at least one restriction, the at least one restriction restricting the transmission of at least a subset of the contact data, and is specified by the user.

In a third aspect of the invention, portable electronic apparatus is disclosed. In one embodiment, the apparatus facilitates the exchange of contact information among a plurality of parties, and includes: a processing apparatus; a computer readable apparatus having a storage medium in data communication with the processing apparatus; and a network interface in data communication with the processing apparatus. The storage medium has at least one computer program stored thereon, the at least one computer program comprising a plurality of computer executable instructions that when executed by the processing apparatus: cause a first party to be contacted with a data transmission request transmitted via the network interface; process an authorization for the data transmission request received from the first party via the network interface; verify a cryptographic element associated with the authorization received from the first party; and transmit information enabling access to contact information associated with the first party to at least a second party.

In one variant, the apparatus further includes: a display device adapted to display at least some information relating to the received authorization; and an input device in operative communication with the processing apparatus, the input device being configured to receive user inputs relating to the second party, and provide them to the at least one computer program for use in the transmission of the information enabling access.

In another variant, the portable device includes a cellular-enabled smartphone having a client application, and the network interface includes a cellular air interface of the smartphone.

In a further variant, at least the processing of an authorization for the data transmission request received from the first party via the network interface, verification of a cryptographic element associated with the authorization received from the first party, and transmission of information enabling access to contact information associated with the first party to at least a second party, are all performed substantially automatically and without user intervention.

In a fourth aspect of the invention, network server apparatus is disclosed. In one embodiment, the server apparatus maintains and facilitates the exchange of contact information among a plurality of parties, and includes: a processing apparatus; a database accessible by the processing apparatus; a computer readable apparatus having a storage medium in data communication with the processing apparatus; and a network interface in data communication with the processing apparatus. The storage medium has at least one computer program stored thereon, the at least one computer program comprising a plurality of computer executable instructions that when executed by the processing apparatus: receive a request for contact data from a first party relating to at least one second party; determine whether it is permissible to send the requested contact data based on information supplied by the second party; and send information permitting access to the requested contact data if the determination indicates that sending is permissible.

In one variant, the request is initiated by a third party in communication with the first party, the third party requesting the at least one second party's contact data from the first party.

In another variant, the determination of whether it is permissible to send includes: sending a request message to the second party from the server apparatus; and process an authorization for the contact data request received from the second party in response to the request message.

In yet another variant, the determination of whether it is permissible to send includes: accessing a pre-stored rule or logic relating to one or more user preferences supplied by the second party; and determining whether it is permissible to send based at least in part on the pre-stored rule or logic and at least one piece of information relating to a party originating the request for the contact data of the second party. The request is initiated by e.g., a third party in communication with the first party, the third party requesting the at least one second party's contact data from the first party.

In still another variant, sending information permitting access to the requested contact data includes sending an authorization to the first party, the authorization authorizing the first party to send the requested contact data to a third party.

In a fifth aspect of the invention, a method of providing contact services is disclosed. In one embodiment, the method includes: providing a server entity having an address associated therewith; receiving an inquiry at the address from a third party, the inquiry requesting data relating to at least one specific user; utilizing the server entity to identify the at least one specific user, and transmit a request to the at least one specific user; and receiving a reply from the user as to the disposition of the request.

In one variant, the address includes a publicly known email address, and wherein the method further includes receiving a plurality of inquiries at the email address relating to respective ones of a plurality of specific users.

In a sixth aspect of the invention, a method of doing business is disclosed. In one embodiment, the method includes: publishing one or more temporary contacts, each temporary contact associated with a user who may be interested in a given product or service; receiving one or more requests from one or more third parties for permanent contacts corresponding to the users associated with the published one or more temporary contacts; receiving one or more responses affirming or denying the one or more requests; and for each affirmed response, providing the one or more permanent contacts to the one or more third parties.

In one variant, at least the acts of publishing, receiving, and compiling are performed substantially automatically by a computerized server.

In another variant, the act of publishing comprises utilizing demographic or user-supplied data to identify the one or more users who may be interested in a given product or service.

In yet another variant, the one or more permanent contacts are compiled within a list.

In a seventh aspect of the invention, a client-based contact management apparatus that maintains contact information for a plurality of applications is disclosed. In one embodiment, the apparatus includes: a processing apparatus; a database accessible by the processing apparatus; a computer readable apparatus having a storage medium in data communication with the processing apparatus. The storage medium has at least one computer program stored thereon, the at least one computer program comprising a plurality of computer executable instructions that when executed by the processing apparatus: receives one or more elements of contact data, and one or more digital signatures; associates the one or more elements of contact data with one or more applications; determines whether it is permissible to accept the received one or more elements of contact data based at least in part on the one or more digital signatures; and responsive to the determination, distributes the one or more elements of contact data to the one or more associated applications.

In one variant, the client-based contact management apparatus additionally includes a network interface.

In another variant, the client-based contact management apparatus additionally includes computer executable instructions that when executed by the processing apparatus: couples a communication session to the network interface. The one or more elements of contact data and one or more digital signatures are received via the coupled network interface.

BRIEF DESCRIPTION OF THE DRAWINGS

FIG. 1 is a graphical representation of one embodiment of a "vCard" format, useful in conjunction with various aspects of the present invention.

DETAILED DESCRIPTION OF THE INVENTION

Figure 2:
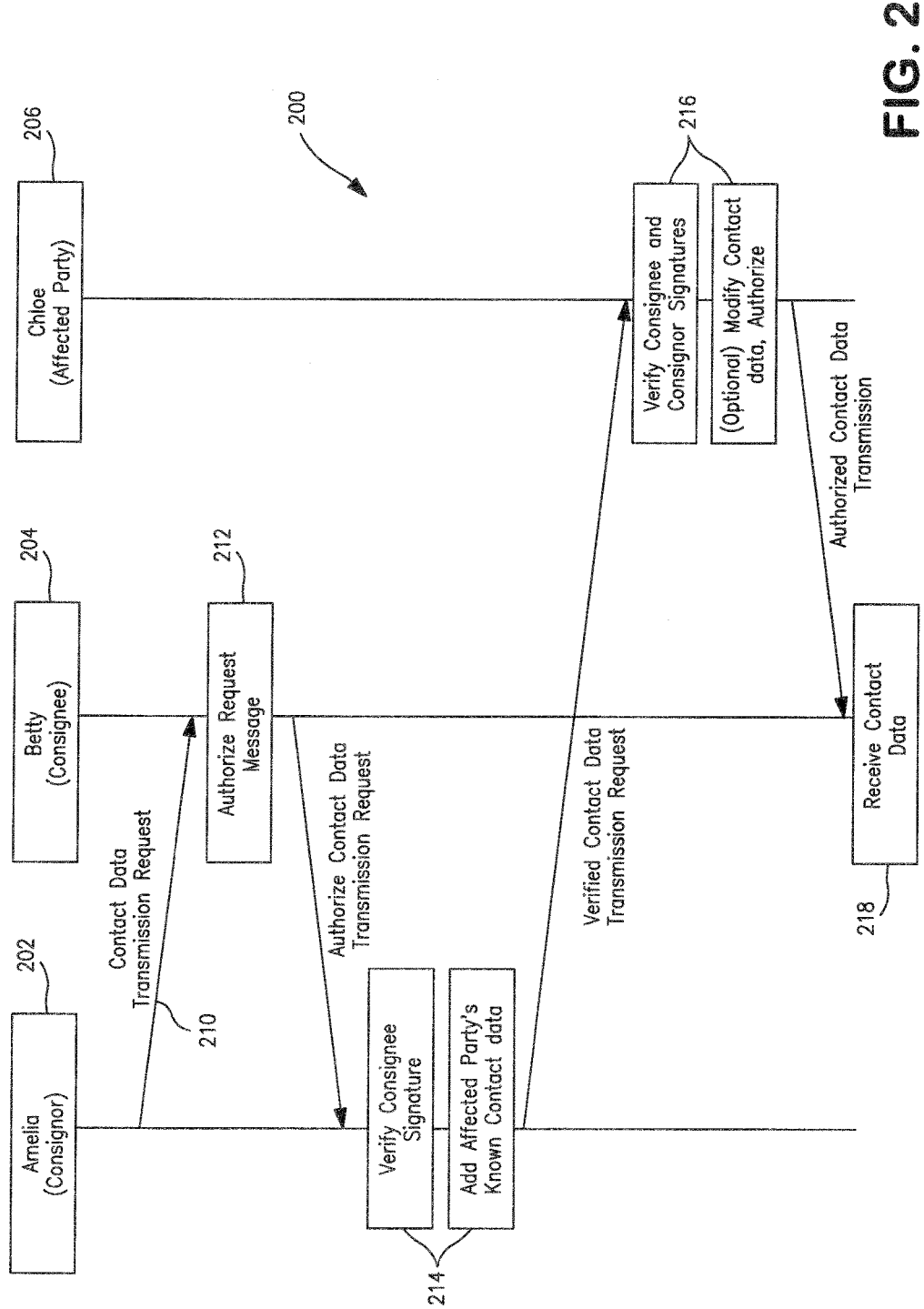
FIG. 2 is a transaction diagram illustrating one exemplary contact data transfer in accordance with the present invention.

Reference is now made to the drawings, wherein like numerals refer to like parts throughout.

Overview

The present invention discloses, inter alia, methods and apparatus that facilitate convenient and secure distribution of contact information. In one exemplary implementation of the invention, transfers of contact information are authorized before transfer. As described in greater detail hereinafter, in one embodiment, the party distributing the contact data, the party receiving the contact data, and the party described by the contact data initiate a secure dialog to exchange contact data. The secure dialog ensures that the affected party (i.e., the party described by the contact data) has both authorized the transaction, and that the transaction is conducted via a secure link or mechanism. Accordingly, appropriately secure messaging in one variant includes digital signatures or other cryptographic data which resist falsification and forgery.

Moreover, the exemplary methods of the invention may include piecemeal authorization and transfer of contact information. In addition to providing authorization prior to distributing contact information, various embodiments also enable modification/update, restriction, or addition of contact information. Such enhanced implementations provide increased user control over the exact portions of shared contact information. Greater flexibility also advantageously provides the ability to support a wide spectrum of use cases.

Further, the authorization and transfer process is greatly optimized to reduce the number of transaction steps. Prior art solutions for contact data exchanges generally include: (i) retrieving contact information from multiple applications, (ii) transmitting contact information from multiple applications (entailing several messaging dialogs), (iii) importing the contact information to the corresponding applications, (iv) the recipient manually requesting authorization from the owner of the contact data for each application, and (v) granting authorization for each contact, for each application. In contrast, in one exemplary implementation of the present invention, a contact management system can perform many of these steps without user interaction, as an aggregate transfer. For example, the contact data can be collected from several communication systems and linked to one person as one "set" of contact data. This linked set can be transferred once. The contact data is sent to the affected user (the user referred to by the contact data) to perform authorization, and selectively manage the information distribution (e.g., add, change, modify contact information, etc).

Additionally, embodiments for large group contact information distribution systems are disclosed. Multiple contact data can be transferred efficiently in one message, and many consignees can be authorized in one step. Various example scenarios for larger groups are described, as are mixed populations (consignees, consignors, and affected parties). Management of such larger groups may be particularly useful for instance in many modern Internet applications which incorporate dynamic, flexible, and potentially massive groups.

An overarching contact management system is also disclosed. In one exemplary embodiment, a contact management system holds multiple contact data for one contact, each with an associated digital signature for authorization. The system contains authorized contact data, and can manage uniform distribution of contact data to all applications or communication systems. Any application can retrieve contact data from the database. Alternately, contact data may be synchronized to various applications by the management system itself. The uniform contact data access point resolves "out of sync" issues; e.g., contact information only updated for a subset of the applications, etc.

Detailed Description of Exemplary Embodiments

Exemplary embodiments of the present invention are now described in detail. While these embodiments are discussed primarily in the context of transferring contact information associated with a user, it will be recognized by those of ordinary skill that the present invention is not so limited. In fact, various aspects of the invention are useful in the automated or authorized transfer of a near limitless amount of categorized data based on parameters such as user identity, recipient identity, account history, etc.

Moreover, while the following exemplary embodiments of the invention are described in the context of transferring information (e.g., related to contacts), it is appreciated that the present invention could be readily applied to broader applications such as the modification, rights administration, or deletion of contact information.

Lastly, while described primarily in the context of cellular wireless systems (e.g., UNITS, etc.), it will be appreciated that the present invention may be applied to any number of different technologies, whether wireless or wireline or optical. Hence, the various aspects of the invention are advantageously bearer-agnostic, and in fact can be applied in heterogeneous hardware and/or software environments if desired.

Exemplary Context—UMTS—

The Universal Mobile Telecommunications System (UMTS) is an exemplary implementation of a "third-generation" or "3G" cellular telephone technology. The UMTS standard is specified by a collaborative body referred to as the $3^{rd}$ Generation Partnership Project (3GPP). The 3GPP has adopted UMTS as a 3G cellular radio system targeted for inter alia European markets, in response to requirements set forth by the International Telecommunications Union (ITU). The ITU standardizes and regulates international radio and telecommunications. Enhancements to UMTS will support future evolution to so-called fourth generation (4G) technology.

The following discussions are described in the context of a Rich Communication Suite (RCS) that consolidates different types of communication services together based on the Internet Protocol (IP) based Multimedia Services (IMS) framework already adopted by the 3GPP. An archetypical RCS implementation enables instant messaging, video sharing and "buddy" lists. These capabilities are also available when the device is used with any other complementary device, or network entity executing peer software via an open network connection. RCS leverages preexisting IMS infrastructure and frameworks for the underlying service platform and support; thus, IMS-based solutions for authentication, authorization, registration, charging, routing, etc. are not further discussed.

RCS is focused largely on (i) enhanced phonebook capabilities, (ii) enhanced messaging capabilities, and (iii) enriched calls. For example, the enhanced phonebook capabilities support presence-enhanced contact information for other devices. Enhanced messaging enables a large variety of messaging options including instant "chat" applications, and messaging history. Enriched calls generally include calls comprising any combination of data, voice, video, audio, etc.

As previously described, the proliferation of complex addressing schemes and the multitude of contact entries per person have made contact management literally unmanageable without assistance. Many people now maintain a paperbound or electronic address book. Electronic address books can be implemented in a number of ways; contact information may be stored in an application specific software program (such as an Internet chat client), in a networked directory (such as a LDAP server (Lightweight Directory Access Protocol), or even as a standalone device (e.g., PDAs (Personal Digital Assistants)).

The vCard file format is one example of a file format commonly used for electronic business cards. A vCard can contain name, email addresses, phone numbers, etc. FIG. 1 illustrates one exemplary vCard 100. The vCard format is based on XML (Extensible Markup Language). As shown, XML supports "elements" (unmodified elements 102), e.g., the element "FN" has a value "James Bond". XML elements may further be modified with "attributes" (modified elements 104), e.g., a "TEL" element may be modified with a "TYPE=HOME". Additionally, XML also supports nested structures (106). In the illustrated example, the "ADR" element consists of a number of sub elements (street, locality, postal code, country). It is appreciated that other formats could easily be interchanged by an artisan of ordinary skill, given the contents of the present disclosure.

As used herein, the terms "vCard", "contact information" and "contact data", etc. are meant to broadly include without limitation any compilation of information associated with human identity or presence. Such contact information may be captured in virtually any format including vCard, generic XML, and the like.

Most advanced electronic address books provide contact information transfer capabilities. Instead of transferring contact information one entry at a time, many electronic address books provide capabilities for bulk transfer. The vCard data format can be sent, stored or imported to communication services; the vCard format also supports bulk transfers of multiple vCards in a single transaction.

Some systems have very lax user privacy policies. For instance, during bulk transfers, the affected user(s) (i.e., the users referenced by the contact information), is not notified of the transaction. In contrast, other systems may be overly restrictive; for example, the consignee (i.e., the user receiving the contact information) must be authorized in order to receive messages or calls from the affected user. Thus, even after receiving the affected user's contact data, the consignee has to request authorization from the affected user.

As described now in greater detail, various aspects of the present invention provide authorization solutions for both individual and aggregate elements of contact data. Additionally, user authorization is performed before exchanging any contact data. The affected party can authorize or deny access to contact data before his user information is transferred; i.e., the affected user can deny requests for contact data, before any information has been sent. Moreover, the affected user can change or modify contact data before the information has been sent. In certain applications, the present invention also discloses including authorizations within the data set in the form of a digital signature.

Example Operation—

Referring now to FIG. 2, one exemplary transmission sequence is shown, illustrating aspects of the present invention. The following example represents a contact information exchange between three (3) parties: a consignor 202 (the party entrusted with contact information), a consignee 204 (the recipient of the contact information), and an affected user 206 (the user referenced by the contact information). It is appreciated that the three parties referenced above need not in fact be human; rather, in some implementations, one or more of these parties is an entity (e.g., organization, logical process, or other substantially inanimate thing).

In the exemplary scenario, the transfer of contact data requires authorization from the affected user to ensure privacy protection. Additionally, the affected user may further limit the transfer of contact information to only a selected subset of the contact data, and/or apply various conditions for its use (e.g., may be read only but not forwarded on or copied, may have a finite persistence or lifetime, etc.). For example, the affected user may choose only to transfer professional contact information to the consignee (by deleting personal data).

In the following example, the described sequence is an atomic or elemental operation. Within the related arts, the terms "atomic" and "elemental" refers to an operation or function that cannot be separated into component parts. For instance, in one example, the transfer is authorized and completes, or the transfer is not authorized and is terminated.

Consider Amelia (the consignor 202) who is a friend of Betty (the consignee 204) and Chloe (the affected user 206). Amelia wants to share Chloe's contact information with Betty. Chloe's contact data is an XML message consisting of: (i) a name, (ii) a home phone number, (iii) a cellular phone number, (iv) a Voice over IP (VoIP) identity (e.g., a Skype® identity), (v) email addresses, (vi) social networking Avatars (e.g., ICQ®, Facebook®, Xing®, Twitter®, etc.).

At step 210, Amelia initiates a contact transfer by transmitting a request message. The request message contains Amelia's contact data, a status, and identifies the consignor (Amelia) and consignee (Betty). One exemplary XML-based request message is provided in Appendix I hereto. In this example, the message is generated and sent from Amelia to Betty via a contact management application software running concurrently with a communication service all parties have in common (for example, a chat client). The request message includes a digital signature (or other cryptographic element) generated by Amelia's client, for subsequent tamper detection/integrity protection.

At step 212, the communication management application of Betty's client receives the message, and responsively prompts Betty to authorize the request (i.e., grant access). In the exemplary case, Betty's client may optionally authenticate (i.e., determine the authenticity of) Amelia's client. If Betty agrees to the transfer, then her contact management application software updates the message, generates another digital signature for the message, and sends the request back to Amelia. One exemplary XML-based authorized request message is provided in Appendix II hereto.

At step 214, Amelia's contact management software receives the contact transaction authorized request. Amelia's client verifies Betty's digital signature using e.g., public/private key cryptography. If Betty's digital signature passes verification, then Amelia's client forwards the verified contact data transmission request to Chloe's client. In the exemplary exchange of FIG. 2, Amelia also includes the known contact information for Chloe (or a subset thereof), for transfer. Moreover, Amelia or Betty may only be requesting a portion of Chloe's entire contact information for transfer; hence, the present invention contemplates transfer of anything ranging from one piece or element of information all the way to a complete transfer of information, whether in one or multiple messages. One exemplary XML-based verified request message is provided in Appendix III hereto.

At step 216, the communication management application of Chloe's client receives the verified request message, and responsively prompts Chloe to transmit her contact information. Chloe may be required to authenticate herself with a password or PIN, biometric data, etc. Also, Chloe may modify the contact data by adding and/or deleting data. Note that this process (and this step) pointedly address deficiencies in the prior art relating to, inter alia, transfer of contact information for a given party without that party's assent or knowledge. In the present embodiment, Chloe must in fact authorize the transfer before the contact information is sent.

At step 218, the contact information is sent directly to Betty's client from Chloe's client. Betty verifies Chloe's digital signature, and then stores Chloe's contact data. Additionally, in one variant, Betty's contact management application(s) can automatically authorize Chloe (and vice versa) as a valid contact without any further signaling exchange. In contrast, some prior art devices must first obtain contact information, contact the affected party, and request authorization before being accepted. One exemplary XML-based contact information transmission is provided in Appendix IV hereto.

Similarly, it can be appreciated that Betty's contact management application provides authorized, uniform distribution of contact data to Betty's other internal applications (e.g., other communication services). The single "point of reference" for contact information transfer advantageously reduces network transaction overhead, and provides a coherent organization for contact data management.

The preceding topology and messaging traffic is purely illustrative, and other embodiments and variations are discussed in greater detail hereinafter. For example, alternative systems may store contact data in a central database (e.g., one associated with a network entity, such as a presence server) rather than via client-based software.

Furthermore, the system may have a different combination of parties. For instance, Betty could have requested Chloe's contact data for other unrelated communication services via a common and previously established communication service. For example, Betty may be aware of Chloe's contact information within a first service (e.g., a chat client, etc.), but require further contact information in order to initiate a second service (e.g., a shared media conference). In this example, Betty's existing chat session is a consignor. Betty's newly initiated session requesting new contact information is a consignee. In yet other examples, the system may have multiple consignors, consignees, or yet other intermediate parties. Other topologies and uses are readily apparent to an artisan having ordinary skill in the related arts, given the contents of the present disclosure.

Methods—

Figure 3:
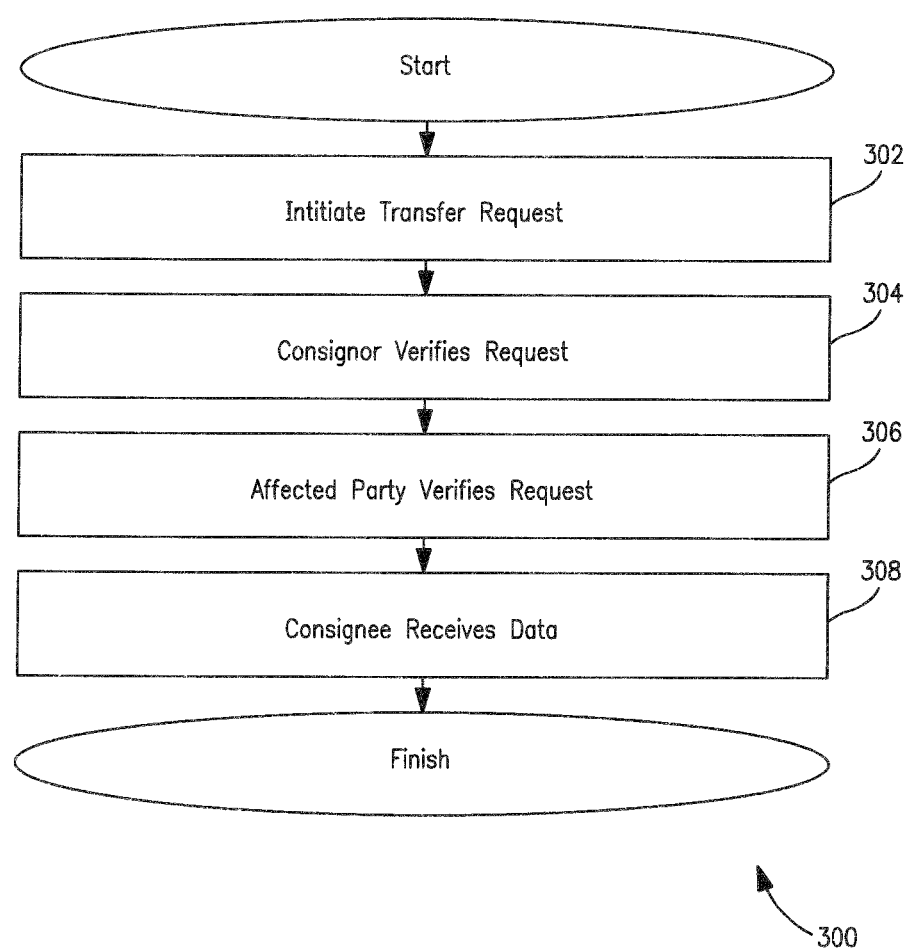
FIG. 3 is flow diagram illustrating one embodiment of a generalized method for distributing contact information in accordance with the invention.

Referring now to FIG. 3, an exemplary embodiment of the method for the controlled distribution of contact information data according to the invention is shown and described in detail. While the following methodology is primarily envisioned as a software application or computer program resident on a computer-readable apparatus (e.g., HDD, flash memory, RAM/ROM, etc.) having storage medium that is executable by a digital processor, it is envisioned that the steps described herein can be implemented in hardware and firmware as well, or alternatively as some combination thereof. As used herein, the terms "computer program" and "software" are meant to include without limitation any sequence of human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

The following discussions are presented in terms of a three (3) party system; however, it will be appreciated the transfer may have any number of actual participants (e.g., two (2) devices, four (4) or more devices, etc.). For example, a first device could request contact data for a second device's other communication protocols, via an existing link. The first device would be trusted on the existing link (i.e., a consignor), and receiving contact data (i.e., a consignee). In another example, a system could have multiple consignees, consignors, and affected parties. For example, a massive conference composed of multiple hubs (consignors), could exchange contact information for each of the members (consignees and affected parties).

At step 302, a request for an affected party's contact data is initiated. In one exemplary embodiment, a consignor (entrusted party) suggests a contact data transfer to the consignee (recipient party). In an alternate embodiment, the consignee requests transfer of the contact data from the consignor (referred to as "pull" delivery). In yet another embodiment, the affected party may suggest that a consignor deliver the contact data to a consignee (also referred to as "push" delivery). As can be appreciated, other systems may freely mix the foregoing combinations. For example, a conference attended by multiple devices may initiate contact information exchanges by consignees, consignors, and/or affected parties.

Additionally, initial requests may be further composed of requests for multiple affected parties, such as in large-scale implementations. For example, a conference application may require contact data for multiple affected parties.

Similarly, in some applications, the initial request may include multiple consignees. For instance, a conference application may deliver contact data to multiple consignees.

Moreover, it is appreciated that multiple initial requests may be made simultaneously, and resolved accordingly. Further discussion of teleconferencing scenarios is provided in greater detail hereinafter (see "Large Party Teleconferencing").

An initial request may include one or more fields, specifying desired contact information. For example, a device may only require application-specific information e.g., machine clients may not require email addresses, home addresses, etc. Additionally, the initial request may include some form of identification or credential for the consignee. In some variants, the request may be required to satisfy authentication requirements. Similarly, the initial requests may identify the affected party, or a number of affected parties. In some cases, identification may be unique (e.g., based on a hardware identification, subscriber identity, etc). In other variants, identification may be text identifier (e.g., "Amelia's cell", "Betty's laptop", etc.).

Referring back to Appendix I, one exemplary initial request includes (i) an affected party, (ii) a status, (iii) the initiating party (in this case, the consignor), (iv), consignor contact information, (v) the consignee, (vi) consignee contact information, and (vii) a digital signature.

As noted, the request message of Appendix I optionally includes a digital signature for security. The digital signature enables quick detection of message tampering or corruption. For example, a digital signature might be generated from a transaction status, and consignee identifier; e.g., through a cryptographic algorithm of the type known in the art based on these inputs. An improper signature would not match the transaction status, or consignee identifier. Digital signatures may be generated with standard cryptographic methods including: symmetric key cryptography, asymmetric key cryptography, etc. In one variant, the digital signature is generated using a cryptographic hash of the transaction status, and consignee identifier (encrypted using a public key/private key encryption infrastructure). Other methods for digital signature generation are well known to those having ordinary skill within the arts, given the contents of the present disclosure.

In one exemplary implementation, the consignor, consignee, and affected party share a common communication program (e.g., an Internet chat client, address book or contact management application, etc.), through which the following transactions can occur. Alternatively, the relevant parties share a common protocol for the transfer of contact data. In yet other implementation, the various parties may "bridge" from one protocol to another; for example, each "leg" (e.g., consignee/consignor, consignor/affected party, affected party/consignee, etc.) may utilize a different protocol.

In addition to the request for contact data, the request may also specify a delivery path, and even communication/protocol details such as device capabilities. For example, the return path may be direct (i.e., directly to the consignee), or via a consignor, or chain of consignors. In some embodiments, the return path is additionally encrypted to prevent security attacks (i.e., the "payload" of sensitive personal data is encrypted, such as via symmetric or asymmetric encryption techniques). Alternatively, the return path may be irrelevant or unspecified; i.e., the consignee is unconcerned with the method the contact data is transferred, and it can be selected based on other considerations (e.g., network optimization, such as via a network entity configured for such purposes).

If step 302 is initiated by a party other than the intended recipient (consignee), then the request must be authorized by the consignee. In some scenarios, the request must also be verified by the consignee. For example, if a consignor initiates the transaction, then the consignee verifies and authorizes the consignor initiated contact information transaction.

At step 304, a consignor (an entrusted party) verifies, and authorizes the request for contact data. In one embodiment, the consignor verifies the consignee's identity. If the consignor successfully verifies the consignee, then the consignor can notify the affected party with a verified request. If, on the other hand, the consignee fails verification, then the process is aborted.

In one exemplary embodiment, the consignor checks the consignee's digital signature. In the aforementioned asymmetric key process, the corresponding digital signature verification asymmetric key cryptography uses a freely available public key from the consignee. The properties of key encryption ensures that only the true consignee could have generated the digital signature (i.e., only the consignee possesses the corresponding private key). Once the consignor has verified the consignee, the consignor can authorize the consignee. Other implementations of the invention may use shared keys, proprietary hashes, etc.

In some embodiments, the verification is performed for at least a subset of combinations of consignees, and affected parties. The authorization sequence may also be specific to the affected party. For example, a request having N consignees and M affected parties could require up to N×M authorization processes. In some cases, some authorization sequences might be skipped (an affected party could notify the consignor that it will accept all requests, those from particular parties or classes of parties, etc.).

The consignee is authorized for contact data by the consignor. The consignor may consider many factors in issuing (or revoking) such authorization. Such factors might include: contact information, application-specific information, consignee type, consignee user, affected party settings, affected party user, consignor user input, automated filter settings, etc. In certain user interface configurations, the consignor device receives input from a user, the input identifying appropriate authorization(s). For example, the user may limit contact data requests to personal or professional information. Similarly, the user may completely deny such requests, even though the request is otherwise valid.

In some automated embodiments, the consignor device authorizes the request based on one or more pre-defined criteria. Such processes may be useful for example with machine-based directory services, and machine clients.

If the consignor authorizes the consignee, then the request for contact data is forwarded to the affected party with the consignor's own signature (in addition to the consignee's signature); alternatively, the forwarded request may include only the consignor or consignee signature. In multi-party embodiments (e.g., multiple consignees, consignors or affected parties, etc.), the request may include a table of signatures, or one aggregated or appended signature.

Optionally, for implementations where the consignee's contact information is included in the original request message, the consignor may additionally verify the contact data integrity, such as via a cryptographic residue or hash. Individual verification of consignee data may be especially useful (or necessary) when multiple consignees are bundled together.

At step 306, the affected party receives the consignee's request for contact data, and verifies the request. In one embodiment, the request is directly received from the consignor. If the request fails verification, then the process is aborted.

In some multi-party configurations, the request includes a "chain" of consignee and consignor nodes. The affected party can optionally verify each node within the chain. In one such variant, each of the nodes is verified individually; alternatively, the chain may be verified as an aggregate. Once the affected party has successfully verified the entire chain of nodes (or selected portions thereof), then the affected party can selectively release all or portions of its contact information for the consignee and/or consignors. In one such case, the affected party releases only a subset of its contact data to the consignee. The affected party may consider many factors in determining appropriate contact data. Such factors might include: application-specific information, consignee type, consignee user, user input, automated filter settings, etc.

The affected user's device may also be configured to receive input from a user identifying the contact information which may be sent. For example, the user may limit contact data requests to personal or professional information. Similarly, the user may completely deny such requests, even though the request is otherwise valid. Additionally, the user interface may provide a listing of the chain of nodes; the user may opt to provide varying degrees of contact information to different nodes.

At step 308, the consignee receives the affected party's contact data. In one exemplary embodiment, the affected party directly contacts the consignee, and transfers the requested contact data. In other approaches, the affected party transmits the contact data to the consignor for trusted delivery to the consignee. In yet other implementations, the affected party transfers the requested data through the chain of nodes e.g., via a chain of connected consignors.

Apparatus—

Exemplary apparatus according to the present invention is now discussed in greater detail.

Figure 4:
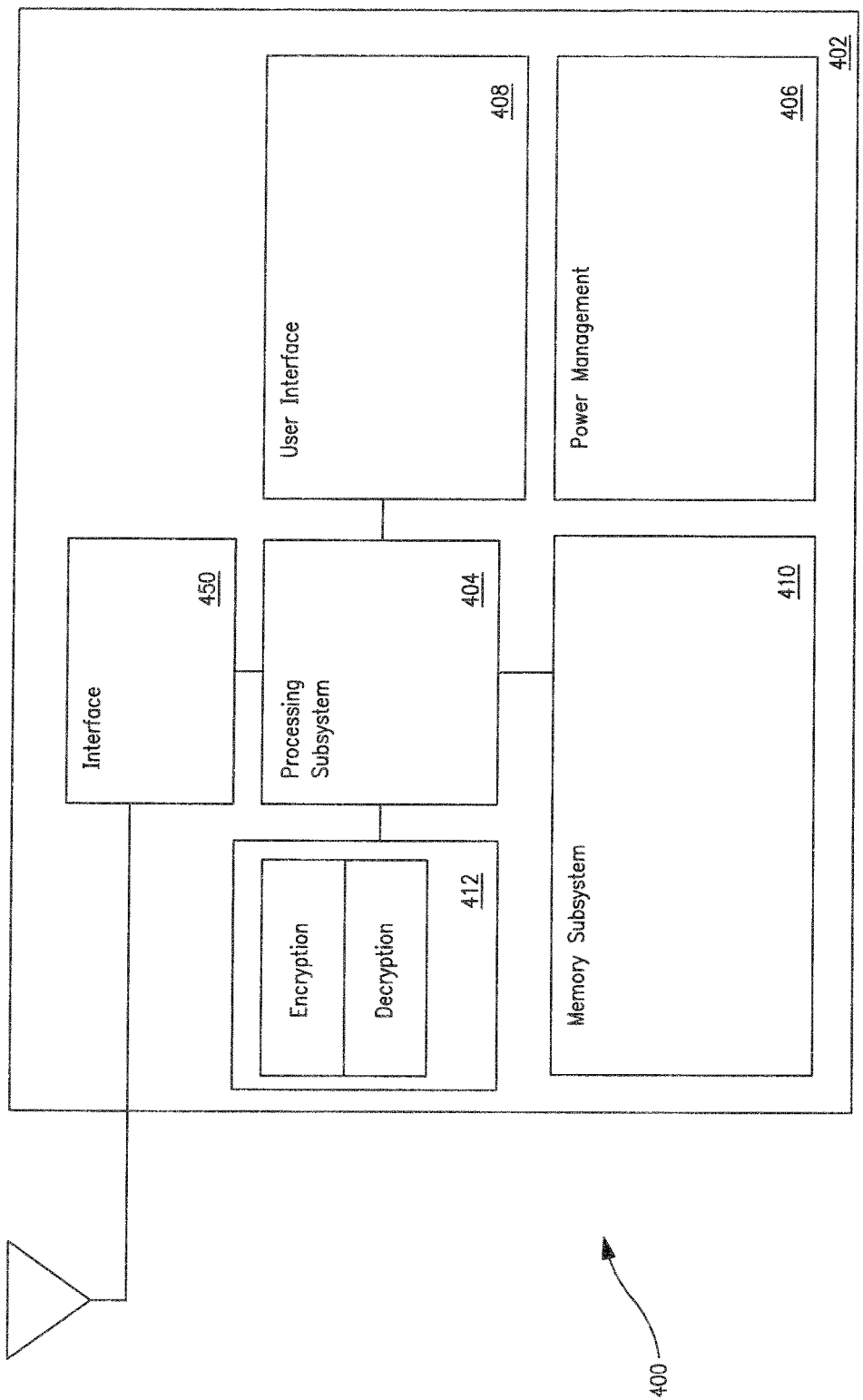
FIG. 4 is a block diagram of one embodiment of a generalized apparatus configured in accordance with the present invention.

Referring now to FIG. 4, one exemplary node apparatus 400 useful in implementing the methods of the present invention is illustrated. The apparatus disclosed includes, inter alia, a device such as a smartphone, computer, personal digital assistant (PDA), or other type of device capable of contact data storage and transfer. The device may be mobile, semi-fixed, or fixed in nature. The foregoing methods are preferably implemented in instructions stored on computer readable media suitable for processor execution, although hardware/firmware embodiments are also envisioned. The device may be mobile, semi-fixed, or fixed in nature.

The apparatus 400 includes one or more substrate(s) 402 that further include a plurality of integrated circuits including a processing subsystem 404 such as a digital signal processor (DSP), microprocessor, programmable logic device (PLD), gate array, or plurality of processing components as well as a power management subsystem 406 that provides power to the apparatus 400, a user interface (UI) subsystem 408, and an interface 450. As used herein, the term "integrated circuit (IC)" refers to any type of device having any level of integration (including without limitation ULSI, VLSI, and LSI) and irrespective of process or base materials (including, without limitation Si, SiGe, CMOS and GaAs).

The processing subsystem may also comprise an internal cache memory. The processing subsystem 404 is connected to a memory subsystem comprising memory which may, for example, include SRAM, Flash and SDRAM/PSRAM components. The memory subsystem may implement one or a more of DMA type hardware, so as to facilitate data accesses, as is well known in the art.

The illustrated power management subsystem (PMS) 406 provides power to the apparatus 400, and may include an integrated circuit and/or a plurality of discrete electrical components. In one exemplary portable apparatus, the power management subsystem 406 interfaces with a rechargeable battery power source within the apparatus. Non-portable apparatus may receive and convert external power (e.g., such as via a transformer, inductive interface, switching supply and Linear Drop Out (LDOs) assembly, etc.).

The user interface subsystem 408 may include any number of well-known I/O devices including, without limitation: a keypad, mouse, touchpad, touch screen (e.g., multi-touch interface), LCD display, backlight, speaker, and/or microphone. However, it is recognized that in certain applications, one or more of these components may be obviated. For example, PCMCIA card type embodiments may lack a user interface (as they could piggyback onto the user interface of the host device to which they are physically and/or electrically coupled). Similarly, machine clients may be entirely automated, requiring no user input.

The apparatus 400 may further include optional additional peripherals including, without limitation, one or more GPS transceivers, or network interfaces such as wireline transceivers (e.g., 802.3, GBE, USB, FireWire™, etc.) and/or wireless (e.g., cellular, satellite, WLAN/Wi-Fi, WiMAX, IrDA ports, Bluetooth transceivers, etc.). It is however appreciated that these components are not required for operation of the apparatus in accordance with the principles of the present invention.

In one embodiment of the apparatus 400, the interface 450 is a wireless interface. In one variant, the wireless interface includes one or more RF front-ends, and a plurality of decoding resources. The RF front-ends generally include the antennas and any analog stages used to convert a received radio signal to a digital signal. A RF front-end may include a wide variety of filters, amplifiers, analog-to-digital converters (A/D), digital-to-analog (D/A) converters (including e.g., direct or delta-sigma converters), mixers, multiplexers, duplexers, diplexers, etc. Due to the very specific nature of RF reception; RF front-ends are generally adapted to a very limited range of operation.

In one alternate embodiment (not shown), the interface 450 is a wireline interface. In one variant, the wireline interface includes one or more A/D (analog to digital) and D/A (digital to analog) converters for converting voltage signals to digital signals (and vice versa). Multiple filtering components are usually included to condition signals within a suitable frequency range, and/or protect components from power surges. In some sophisticated variants, the wireline interface implements higher level network functionality, including routers, firewalls, etc.

In some instances, multiple interfaces 450 may be required for different protocols. For example, wireless implementations may maintain multiple wireless interfaces (e.g., Bluetooth, Wi-Fi, Cellular). Multiple antenna approaches may support any combination of MIMO (Multiple Input Multiple Output), SIMO (Single Input Multiple Output), MISO (Multiple Input Single Output), and SISO (Single Input Single Output) antennas. Similarly, the apparatus may have multiple wireline interfaces (e.g., Universal Serial Bus, Ethernet, Coaxial Cable, etc.).

Contact Information Storage—

In one exemplary embodiment, the processing subsystem of the apparatus 400 is coupled to memory adapted for storing contact information 410. In one variant, contact data memory structures are non-volatile (i.e., do not require power to retain information in memory). Alternatively contact data may be stored in volatile memory structures (which may be corrupted or lose data without power). Hard disc, ferromagnetic media, EEPROM, and FLASH based memories are common examples of non-volatile memories; RAM, DRAM, SRAM, SDRAM are typical volatile memory devices.

Contact information storage devices 410 store multiple elements of contact data in some form of association with one or more index values. Implementations of contact data storage span a range from simple lookup tables or structures (support for a single index value) to complex relational databases (multiple methods of indexing, filtering, associating, etc.). In one exemplary embodiment, a simple RCS database consists of a number of contact data entries, each entry having one or more of (i) a name, (ii) a plurality of phone numbers, (iv) email addresses, (v) and social networking Avatars (e.g., ICQ®, Facebook®, Xing®, Twitter®, etc.).

In some implementations, the storage 410 may include protection mechanisms. For example, contact data encryption may require user authentication in order to access, modify, or share contact data entries. Such protection may have varying levels of access; for instance, corporate and/or military applications may support varying degrees of user authentication to protect sensitive contact information.

In addition to contact data entries, the contact information storage device may further include memory support for other metadata. Metadata is not contact data per se, but rather data associated with the contact data. For example, metadata may include: the entry's previously shared information (i.e., what the affected party has released to the contact), encryption methods supported, protocols, URLs, degrees of trust specific to an entry, one or more digital signatures or authorization records, etc.

Digital Signature Subsystems—

In one aspect of the present invention, access to the contact data is controlled based on user verification, and authorization. In one exemplary embodiment, encryption and decryption subsystems 412 verify data transactions, enforcing security policies.

Such encryption and decryption may be based on asymmetric key encryption. Asymmetric key encryption ensures that the recipient has a different key than the sender; thus, the recipient can decode messages, but cannot generate messages. For example, one encryption subsystem generates a signature based on a private key. The complementary decryption subsystem can verify or reject a signature given with a message, and the proper corresponding key (which is different from the sender's private key). The foregoing process relies on the secrecy of the keys, as well as the mathematical difficulty in reproducing the keys.

In alternate embodiments, encryption and decryption may be based on symmetric key encryption. For example, one encryption subsystem has a private key which is transferred to the destination in an "out-of-band" process. Such systems may be especially useful when transferring contact information for different interfaces (e.g., transfer of email addresses via a cellular network, etc.).

In the illustrated embodiment, the encryption and decryption subsystems 412 are coupled to the processing subsystem 404. However in other approaches, the encryption and decryption may be performed within the interface 450, or alternately at the memory subsystem 410. In fact, wireless embodiments may preferably leverage existing encryption and decryption subsystems of the radio (e.g., cellular, WLAN, PAN, etc.) interface. In contrast, wireline embodiments may prefer to perform encryption and decryption in software (e.g., executed within the processing subsystem 404).

Many other schemes for verification have been explored within the prior art. Digital signatures guarantee the transmission source, and the integrity of the message. Accordingly, other solutions which provide similar qualities could be interchangeably used consistent with the present invention. More specifically, some scenarios are inherently legitimate, and do not require further authentication. For example, "out-of-band" verification of the transmission source and message integrity could be substituted. Additional discussion of out-of-band scenarios are provided in greater detail hereinafter (see "Out-Of-Band Teleconferencing").

Common digital signature schemes include, Full Domain Hash, Digital Signature Algorithm (DSA), Secure Hash Algorithms (SHA-1, SHA-2, etc.), as well as algorithms based on other mathematically difficult problems (logarithms, geometry, and factorization). Additionally, aggregate signature algorithms may be used to ensure multiple signatures. Aggregate signatures support the additional property that the number of users signing the signature cannot be determined; for example, given J signatures on K messages from L users, the resulting single signature has a constant size.

Modifications to other solutions for digital signatures within the frameworks as described herein are well within the skills of an ordinary artisan, given the present disclosure.

Additional Use Scenarios—

Figure 5:
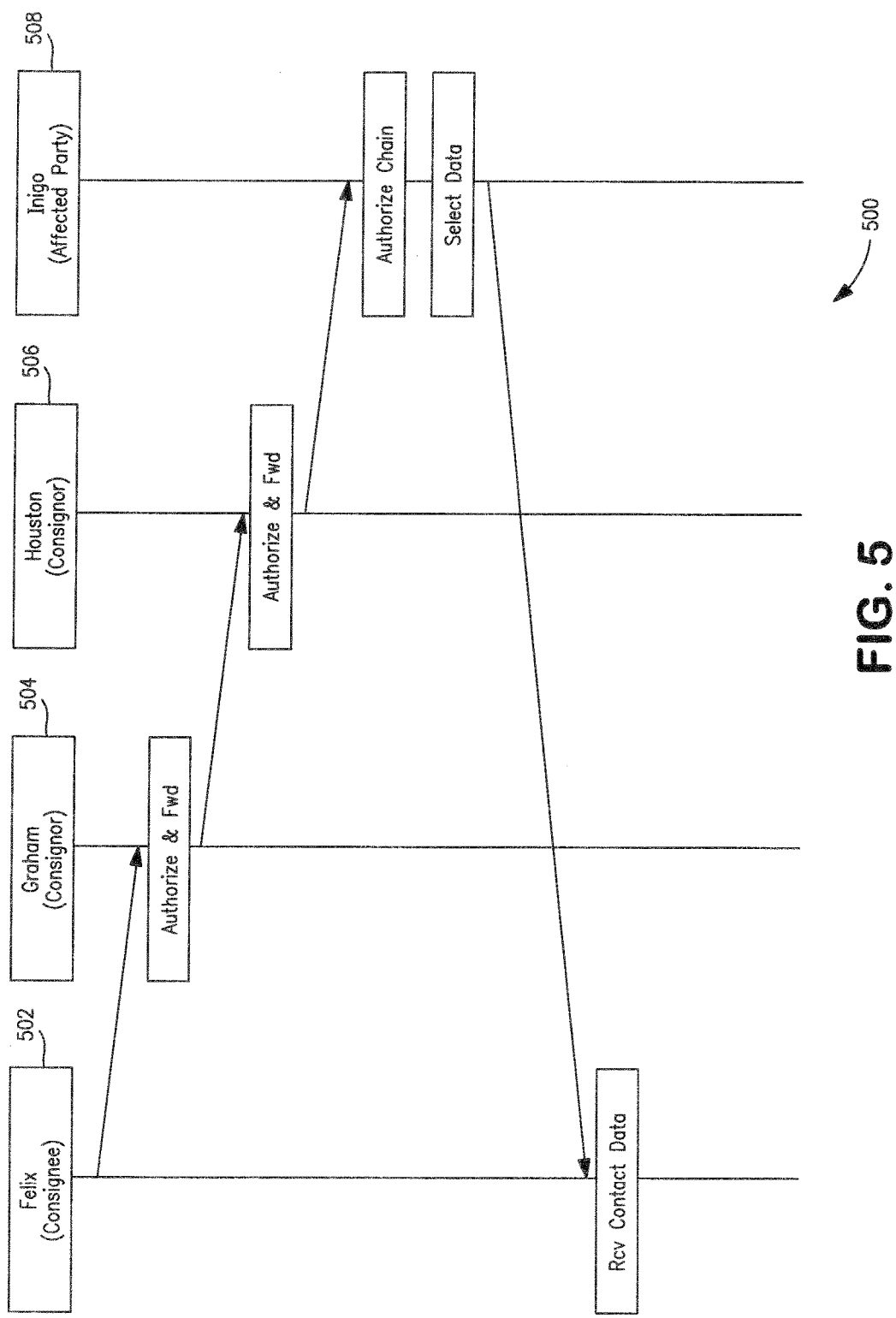
FIG. 5 is a transaction diagram illustrating one exemplary embodiment of a chained contact data transfer in accordance with the present invention.
Figure 6:
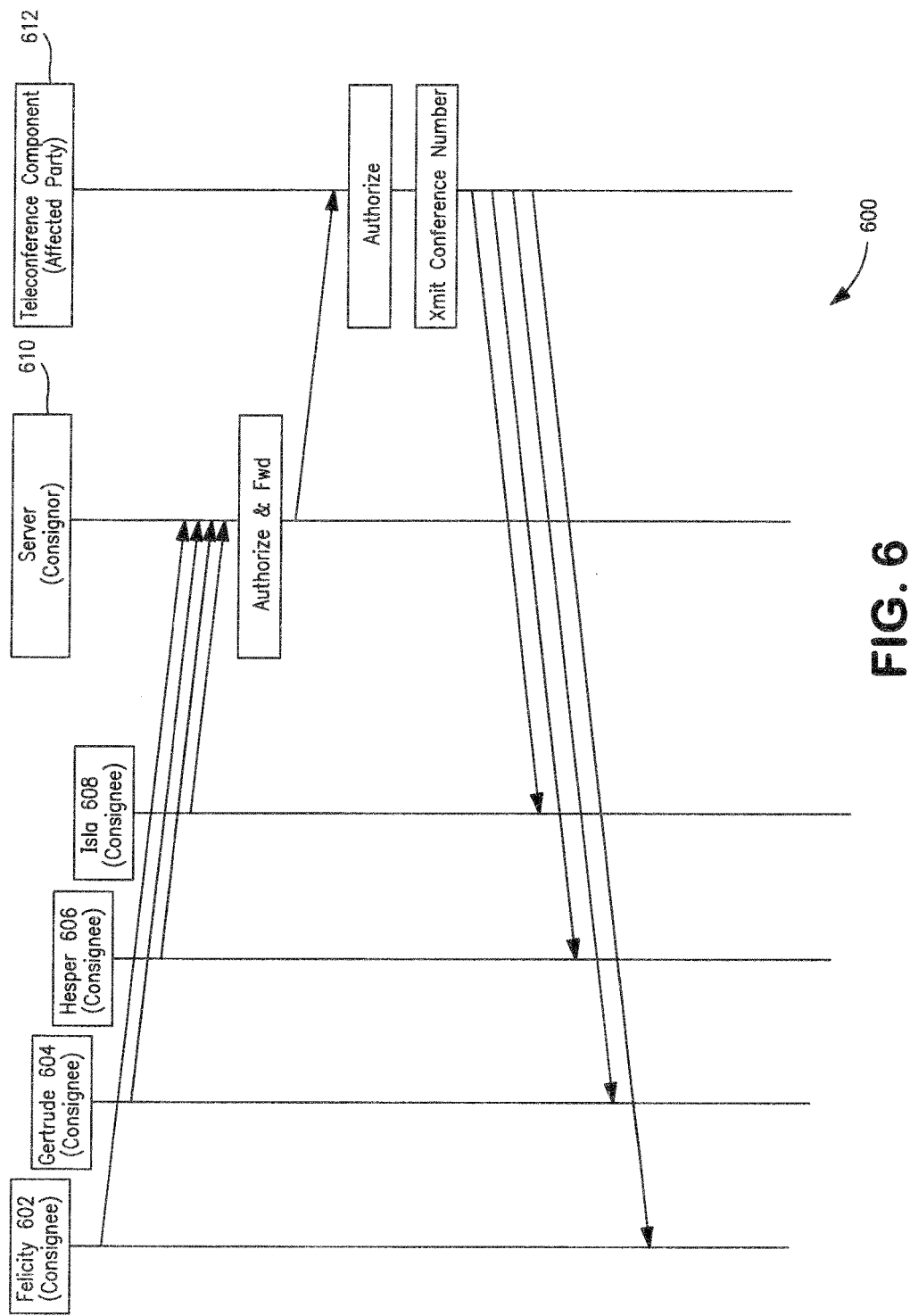
FIG. 6 is a transaction diagram illustrating one exemplary embodiment of a large party teleconference data transfer in accordance with the present invention.
Figure 7:
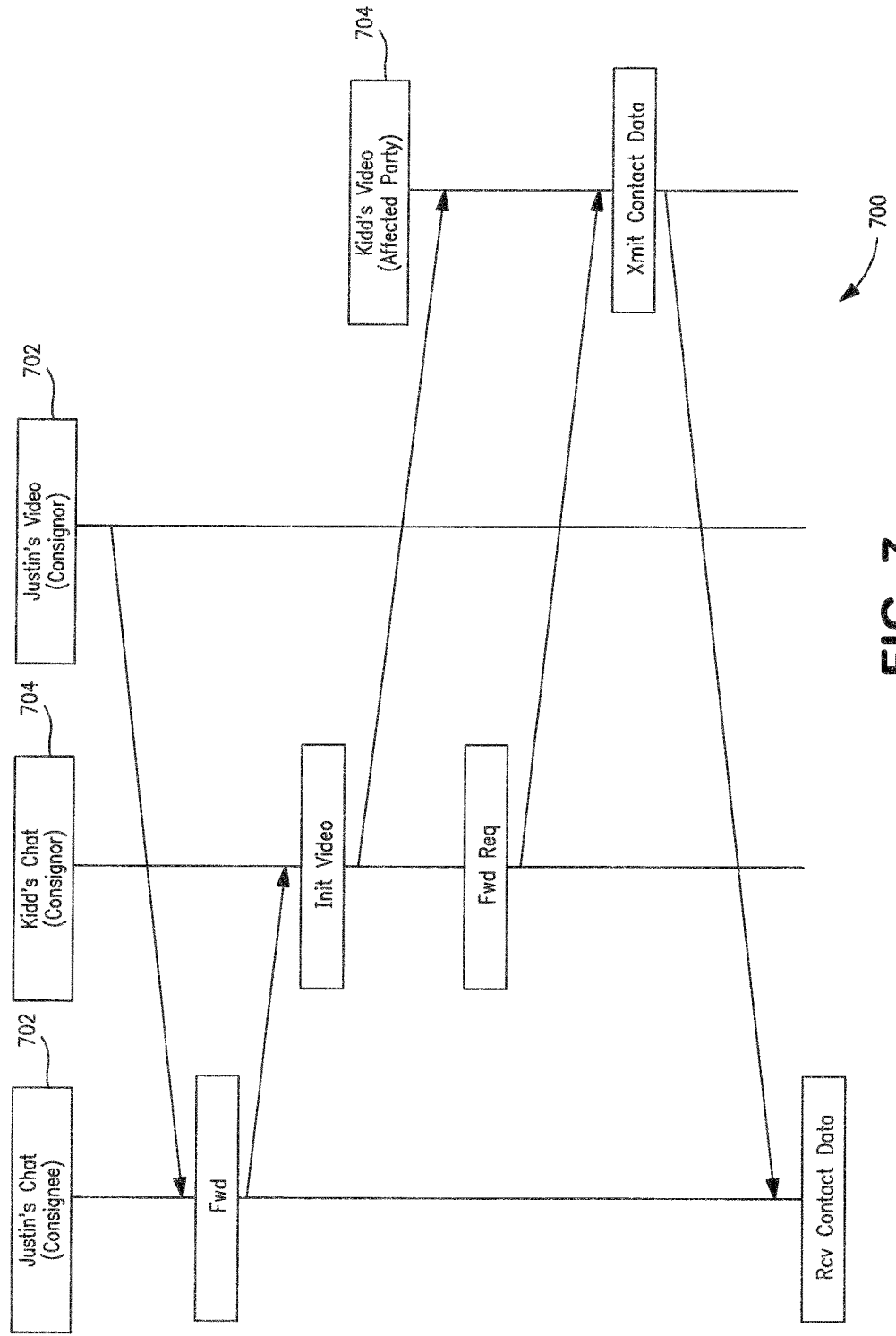
FIG. 7 is a transaction diagram illustrating one exemplary embodiment of an unauthenticated data transfer in accordance with the present invention.

Referring now to FIGS. 5-7, additional use cases or scenarios are provided to further illustrate useful applications of various aspects of the present invention.

Chained Contact Transfer—

FIG. 5 illustrates one exemplary chained application 500 according to the invention. In this example, "Felix" 502, and "Graham" 504 work together at a first company making steel balls, while "Houston" 506, and "Inigo2" 508 work together at a second company making bearings. Graham and Houston are project leads, and communicate frequently. However, Felix and Inigo are engineers and do not know of one another. After a brief meeting, Felix and Inigo are tasked with settling on final specifications; however, Felix forgot to get Inigo's phone number.

Shortly thereafter, Felix (consignee) requests Inigo's (affected party) contact information from Graham (first consignor). Graham authorizes Felix, but must forward the request onto Houston (second consignor). Houston authorizes Graham's message, forwarding it to Inigo. Inigo can check the entire chain, and only transfer his professional contact information (e.g., name, phone, email, etc.) back to Felix.

In this illustrated example, Inigo can directly transfer the contact data to Felix, thus limiting his contact exposure (i.e., Graham may never receive any data at all). In alternate scenarios, Inigo may pass his information down the "chain" (allowing Graham to also receive the information).

Large Party Teleconferencing—

Online massively multiplayer online role-playing games (MMORPGs) can be played by multiple anonymous video game enthusiasts. Traditionally, players exchange contact information for teleconference augmented-play, to improve teamwork and enhance the playing experience. Clearly, it is undesirable to share personal information with strangers online.

Referring now to FIG. 6, in the exemplary large party conference 600, four (4) participants (Felicity 602, Gertrude 604, Hesper 606, and Isla 608) have been playing a MMORPG game on an automated server 610. Each of the participants requests a conference number from the hub (consignor). The hub autonomously assigns a conference component (affected party) 612, and transmits the conference number (or initiates a call) from the conference component to each of the participants (consignees). Most notably, in this example, each of the consignee's personal information (Felicity 602, Gertrude 604, Hesper 606, and Isla 608) is completely hidden from all other consignees; the only affected party is a conference component.

The foregoing teleconferenced game play can be performed with existing telephone (e.g., PSTN/POTS, VoIP, or cellular) circuits, thereby allowing all players to conference external to the game application, without specialized software/hardware. Advantageously, game developers do not need to develop complex codec support, or support internal teleconferencing apparatus, etc.

Out-of-Band Teleconferencing

FIG. 7 illustrates one exemplary out-of-band application 700. In this example, "Justin" 702, and "Kidd" 704 are chatting via a first chat client. Justin would like to open up a separate video application with Kidd. In this example, Justin is both the consignee and the consignor.

Justin opens the video application. The video application automatically detects, the existing chat client, and displays a message to the user via a user interface (UI) for Justin. Justin authorizes the video client's request for Kidd's video contact information; Kidd's chat client opens a dialog box, requesting authorization to release video client contact information. Kidd accepts, and the video clients link.

In this example, Justin and Kidd have an ongoing secure chat client. The entire transaction can be performed via existing authenticated links; no additional authentication steps were required.

Business Methods—

Users generally desire improved control over their contact information. Accordingly, appropriately enabled apparatus according to the present invention can be marketed and sold at a premium over non-capable alternatives. In fact, more drastic measures may be implemented to tightly control user data; contact data may not be available for non-enabled devices. Specialized, closed systems are especially useful in e.g., limited financial, commercial, and military areas.

Consider an automated "consignor" apparatus that can be used to filter contact information distribution. For example, a company may purchase a "consignor" email chatterbot or "bot" (e.g., a computer program designed to recognize and respond to human dialog or text conversation) having a widely publicized email address (e.g., consignor@apple.com). People may email the email address with directory search inquiries. The consignor bot, using an internal secure email directory, identifies the appropriate party, and transmits the request. The internal party is protected from both malicious activity (e.g., phishing, brute force attacks, etc.), while at the same time, having the ability to respond securely to legitimate queries. Furthermore, the internal party is able to control the distribution of his contact data. For example, if the internal party is being contacted by a professional contact (such as a distributor, or solicitor) the internal party can authorize corresponding data. In contrast, if the consignee is a personal acquaintance, the internal party can provide personal data.

In other embodiments, commercial concerns typically pay a premium to target communications (e.g., advertisements, notifications, etc.) to interested consumers. The use of a consignor to pre-filter contacts presents a good opportunity to pre-screen future customers for interest. For example, a professional trade conference could use an automated consignor apparatus to control information distribution. A participant may use a temporary conference specific contact (e.g., an email, or conference ID), to receive conference specific information regarding the visiting vendors. After the conference has ended, the participant can choose to distribute his actual contact information to the limited subset of the presenters he actually met. The automated consignor compiles a focused list therefrom. In comparison to blindly broadcasted "spam" messages, sign-up lists, etc. the automated consignor shields both the participant and presenter contact information Both parties must agree to the transfer of information, thereby greatly reducing "spain" mailing lists, etc.

In yet another embodiment, a consignor may be used to anonymously broker an exchange between two parties. A consignor may collect certain criteria, such as goods for sale, and goods desired. A matching listing would initiate a contact data transaction between the two parties, potentially with an entirely anonymous contact modality (e.g., a temporary address, etc.). The entire sale transaction could be performed in complete anonymity.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

APPENDIX I

Exemplary XML-Based Request Message
© Copyright 2009 Apple Inc. All rights reserved.

```
<?xml version="1.0" encoding="utf-8" standalone="yes"?>
<!-- Message #1 -->
<contact data transmission>
    <transaction>
        <id>
            38b060a751ac96384cd9327eb1b1e36a21fdb71114be0743
            4c0cc7bf63f6e1da274edebfe76f65fbd51ad2f14898b95b
        </id>
        <contact>
            <name>
                <forename>Chloe</forename>
                <surname>Doe</surname>
            </name>
        </contact>
        <status>authenticate_consignee</status>
    </transaction>
    <consignor>
        <name>
            <forename>Amelia</forename>
            <surname>Smith</surname>
        </name>
        <service>
            <icq>
                <number>5556376</number>
            </icq>
        </service>
        <signature>68ac906495480a3404beee4874ed853a037a7a8f</signature>
    </consignor>
    <consignee>
        <name>
            <forename>Betty</forename>
            <surname>Barclay</surname>
```

APPENDIX I-continued

Exemplary XML-Based Request Message
© Copyright 2009 Apple Inc. All rights reserved.

```xml
        </name>
        <service>
            <icq>
                <number>5558824</number>
            </icq>
        </service>
        <signature />
    </consignee>
</contact data transmission>
```

APPENDIX II

Exemplary XML-based Authorized Message
© Copyright 2009 Apple Inc. All rights reserved.

```xml
<?xml version="1.0" encoding="utf-8" standalone="yes"?>
<!-- Message #2 -->
<contact data transmission>
    <transaction>
        <id>
            38b060a751ac96384cd9327eb1b1e36a21fdb71114be0743
            4c0cc7bf63f6e1da274edebfe76f65fbd51ad2f14898b95b
        </id>
        <contact>
            <name>
                <forename>Chloe</forename>
                <surname>Doe</surname>
            </name>
        </contact>
        <status>consignee_authenticated</status>
    </transaction>
    <consignor>
        <name>
            <forename>Amelia</forename>
            <surname>Smith</surname>
        </name>
        <service>
            <icq>
                <number>5556376</number>
            </icq>
        </service>
        <signature>68ac906495480a3404beee4874ed853a037a7a8f</signature>
    </consignor>
    <consignee>
        <name>
            <forename>Betty</forename>
            <surname>Barclay</surname>
        </name>
        <service>
            <icq>
                <number>5558824</number>
            </icq>
        </service>
        <signature>d8e8ece39c437e515aa8997c1a1e94f1ed2a0e62</signature>
    </consignee>
</contact data transmission>
```

APPENDIX III

Exemplary XML-based Verified Message
© Copyright 2009 Apple Inc. All rights reserved.

```xml
<?xml version="1.0" encoding="utf-8" standalone="yes"?>
<!-- Message #3 -->
<contact data transmission >
    <transaction>
        <id>
            38b060a751ac96384cd9327eb1b1e36a21fdb71114be0743
            4c0cc7bf63f6e1da274edebfe76f65fbd51ad2f14898b95b
```

APPENDIX III-continued

Exemplary XML-based Verified Message
© Copyright 2009 Apple Inc. All rights reserved.

```xml
        </id>
        <contact>
            <name>
                <forename>Chloe</forename>
                <surname>Doe</surname>
            </name>
        </contact>
        <status>consignee_authenticated</status>
    </transaction>
    <consignor>
        <name>
            <forename>Amelia</forename>
            <surname>Smith</surname>
        </name>
        <service>
            <icq>
                <number>5556376</number>
            </icq>
        </service>
        <signature>68ac906495480a3404beee4874ed853a037a7a8f</signature>
    </consignor >
    <consignee>
        <name>
            <forename>Betty</forename>
            <surname>Barclay</surname>
        </name>
        <service>
            <icq>
                <number>5558824</number>
            </icq>
        </service>
        <signature>d8e8ece39c437e515aa8997c1a1e94f1ed2a0e62</signature>
    </consignee>
    <contact>
        <name>
            <forename>Chloe</forename>
            <surname>Doe</surname>
        </name>
<phone>
            <country>01</country>
            <prefix>149</prefix>
            <number>5557325</number>
            <signature />
        </phone>
        <cellular>
            <country>01</country>
            <prefix>149</prefix>
            <number>55572523</number>
            <signature />
        </cellular>
        <skype>
            <nickname>chloe_doe</nickname>
            <signature />
        </skype>
        <icq>
            <number>5553836</number>
            <nickname>chloe</nickname>
            <signature />
        </icq>
        <msn>
            <user_id>chloe.doe@msn.com</user_id>
            <signature />
        </msn>
        <yahoo>
            <user_id> chloe.doe@yahoo.com</user_id>
            <signature />
        </yahoo>
        <google_wave>
            <user_id>chloe.doe@gmail.com</user_id>
            <signature />
        </google_wave>
        <facebook>
            <user_id>chloed72</user_id>
            <signature />
```

APPENDIX III-continued

Exemplary XML-based Verified Message
© Copyright 2009 Apple Inc. All rights reserved.

```xml
        </facebook>
        <xing>
            <user_id>cdoe72</user_id>
            <signature />
        </xing>
        <twitter>
            <user_id>tweeting_chloe</user_id>
            <signature />
        </twitter>
    </contact>
</contact data transmission >
```

APPENDIX IV

Exemplary XML-based Contact Information Transmission
© Copyright 2009 Apple Inc. All rights reserved.

```xml
<?xml version="1.0" encoding="utf-8" standalone="yes"?>
<!-- Message #4 -->
<contact data transmission >
    <transaction>
        <id>
            38b060a751ac96384cd9327eb1b1e36a21fdb71114be0743
            4c0cc7bf63f6e1da274edebfe76f65fbd51ad2f14898b95b
        </id>
        <contact>
            <name>
                <forename>Chloe</forename>
                <surname>Doe</surname>
            </name>
        </contact>
        <status>authorized</status>
    </transaction>
    <consignor>
        <name>
            <forename>Amelia</forename>
            <surname>Smith</surname>
        </name>
        <service>
            <icq>
                <number>5556376</number>
            </icq>
        </service>
        <signature>68ac906495480a3404beee4874ed853a037a7a8f</signature>
    </consignor >
    <consignee>
        <name>
            <forename>Betty</forename>
            <surname>Barclay</surname>
        </name>
        <service>
            <icq>
                <number>5558824</number>
            </icq>
        </service>
        <signature>d8e8ece39c437e515aa8997c1a1e94f1ed2a0e62</signature>
    </consignee>
    <contact>
        <name>
            <forename>Chloe</forename>
            <surname>Doe</surname>
        </name>
    <phone>
        <country>01</country>
        <prefix>149</prefix>
        <number>5557325</number>
        <signature />
    </phone>
    <cellular>
        <country>01</country>
        <prefix>149</prefix>
        <number>55572523</number>
        <signature />
```

APPENDIX IV-continued

Exemplary XML-based Contact Information Transmission
© Copyright 2009 Apple Inc. All rights reserved.

```
    </cellular>
    <skype>
        <nickname>chloe_doe</nickname>
        <signature>da39a3ee5e6b4b0d3255bfef95601890afd80709</signature>
    </skype>
    <icq>
        <number>5553836</number>
        <nickname>chloe</nickname>
        <signature>86adf6544adf645daf77665dfd755b66b6d75a77</signature>
    </icq>
    <msn>
        <user_id>chloe.doe@msn.com</user_id>
        <signature>67efb6754ebf7ef89fbe9b8fe6bfe5bfe2332ef5</signature>
    </msn>
    <yahoo>
        <user_id> chloe.doe@yahoo.com</user_id>
        <signature>56aed65d5d643a3e76879ae096d5de3a212ada6d</signature>
    </yahoo>
    <facebook>
        <user_id>chloed72</user_id>
        <signature>a552233b445343d23245e32435467f4543343434</signature>
    </facebook>
    <twitter>
        <user_id>tweeting_chloe</user_id>
        <signature>562432743f28262673a8363b4373256282e28383</signature>
    </twitter>
  </contact>
</contact data transmission >
```

What is claimed is:

1. A portable electronic apparatus associated with a first party that facilitates exchange of contact information among a plurality of parties, comprising:
  a processing apparatus;
  a computer readable apparatus having a non-transitory storage medium in data communication with the processing apparatus: and
  a network interface in data communication with the processing apparatus;
  wherein the non-transitory storage medium has at least one computer program stored thereon, the at least one computer program comprising a plurality of computer executable instructions that when executed by the processing apparatus, cause the portable electronic apparatus to:
    cause a second party to be contacted with a data transmission request transmitted via the network interface, the data transmission request comprising a request for a contact information associated with a third party;
    process an authorization for the data transmission request received from the second party via the network interface, where the process is further configured to verify a digital signature of the second party at the portable electronic apparatus; and
    when the verification of the digital signature of the second party is successful, transmit information to the third party that is configured to enable access for download retrieval of the contact information associated with the third party by the second party from the third party, only after the download retrieval has been authorized by the third party;
    wherein the information configured to enable access for the download retrieval of the contact information associated with the third party comprises both (i) a digital signature from the first party that facilitates exchange of the contact information and (ii) the digital signature of the second party, that was verified by the first party.

2. The portable apparatus of claim 1, further comprising:
  a display device adapted to display at least some information that relates to the received authorization; and
  an input device in operative communication with the processing apparatus, the input device being configured to receive user inputs relating to the first party, and provide them to the at least one computer program for use in the transmission of the information that is configured to enable access.

3. The portable apparatus of claim 1, wherein the portable device comprises a cellular-enabled smartphone having a client application, and the network interface comprises a cellular air interface of the smartphone.

4. The portable apparatus of claim 1, wherein at least the authorization for the data transmission request received from the second party via the network interface, and transmission of information configured to enable access for download retrieval of the contact information associated with a device associated with the third party to at least the second party, are all performed substantially automatically and without user intervention.

5. The portable apparatus of claim 1, wherein the download retrieval of the contact information associated with the third party comprises a modification of the contact information by the third party.

6. A computer readable apparatus having a non-transitory storage medium with at least one computer program stored thereon, the at least one computer program comprising a plurality of computer executable instructions that when executed by a processor, causes a second party's client device to:
  receive a data transmission request transmitted from a first party via a network interface, the data transmission request comprising a request for a contact information associated with a third party;

authorize the received data transmission request from the first party's client device, where the received data transmission request requests permission to share a third party's contact information with the second party's client device; and transmit an authorization message comprising a digital signature of the second party's client device to the first party's client device, where the authorization message is configured to allow the first party's client device to share the third party's contact information to at least the second party's client device via a transmission of the third party's contact information from the third party's client device;

wherein the transmission of the third party's contact information from the third party's client device occurs responsive to an authorization of: (i) a digital signature from the first party that facilitates exchange of the contact information and (ii) the digital signature of the second party that is verified by the first party.

7. The computer readable apparatus of claim 5, wherein the authorization message includes a digital signature used to authenticate the third party's client device.

8. The computer readable apparatus of claim 5, wherein the contact information is associated with the third party, who is neither the first party nor the second party.

9. The computer readable apparatus of claim 5 wherein at least one of the request and the authorization message comprise an extensible markup language (XML)-based message.

10. The computer readable apparatus of claim 5, wherein the authorization message comprises at least one restriction, where the at least one restriction is configured to restrict transmission of at least a subset of the contact data.

11. The computer readable apparatus of claim 5, wherein the at least one restriction is specified by the third party.

12. The computer readable apparatus of claim 5, wherein the transmission of the third party's contact information from the third party's client device further comprises a modification of the contact information by the third party.

13. A method for transmitting contact information of an affected party device to a consignee device, the method comprising:

receiving at the affected party device, a contact data transmission request from a consignor device, the contact data transmission request comprising at least a first digital signature associated with the consignee device and a second digital signature associated with the consignor device;

wherein the first digital signature indicates a successful authorization of the contact data transmission request by the consignee;

wherein the second digital signature indicates a successful verification of the contact data transmission request by the consignor;

verifying the first digital signature associated with the consignee device and the second digital signature associated with the consignor device; and when the act of verifying is successful, (i) authorizing a transfer of the contact information of the affected party device and (ii) modifying the contact information, before transmitting the contact information of the affected party device to the consignee device from the affected party device.

14. The method of claim 13, wherein the affected party device, the consignee device, and the consignor device each comprises a portable device with each device being associated with a different user.

15. The method of claim 14, wherein each of the portable devices comprises a cellular-enabled smartphone having a client application and the receiving, verifying, and transmitting are each accomplished using a cellular air interface of the cellular-enabled smartphone.

16. The method of claim 13, wherein at least the acts of receiving, verifying, and transmitting of the contact information are performed substantially automatically.

17. The method of claim 13, further comprising when the act of verifying is not successful, terminating the contact data transmission request from the consignor device.

18. The method of claim 13, wherein the act of modifying the contact information of the affected party comprises adding or deleting portions thereof.

19. The method of claim 13, wherein the act of authorizing the transfer of the contact information of the affected party device comprises prompting a user of the affected party device to transfer the contact information.

* * * * *

UNITED STATES PATENT AND TRADEMARK OFFICE
CERTIFICATE OF CORRECTION

PATENT NO. : 9,603,171 B2
APPLICATION NO. : 12/635470
DATED : March 21, 2017
INVENTOR(S) : Achim Luft et al.

It is certified that error appears in the above-identified patent and that said Letters Patent is hereby corrected as shown below:

In the Claims

Currently reads (Claim 7 – Column 29) Lines 20-22:
"7. The computer readable apparatus of claim 5, wherein the authorization message includes a digital signature used to authenticate the third party's client device."

Should read (Claim 7 – Column 29):
-- 7. The computer readable apparatus of claim 6, wherein the authorization message includes a digital signature used to authenticate the third party's client device. --

Currently reads (Claim 8 – Column 29) Lines 23-25:
"8. The computer readable apparatus of claim 5, wherein the contact information is associated with the third party, who is neither the first party nor the second party."

Should read (Claim 8 – Column 29):
-- 8. The computer readable apparatus of claim 6, wherein the contact information is associated with the third party, who is neither the first party nor the second party. --

Currently reads (Claim 9 – Column 29) Lines 26-29:
"9. The computer readable apparatus of claim 5 wherein at least one of the request and the authorization message comprise an extensible markup language (XML)-based message."

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*

Should read (Claim 9 – Column 29):
-- 9. The computer readable apparatus of claim 6 wherein at least one of the request and the authorization message comprise an extensible markup language (XML)-based message. --

Currently reads (Claim 10 – Column 29) Lines 30-33:
"10. The computer readable apparatus of claim 5, wherein the authorization message comprises at least one restriction, where the at least one restriction is configured to restrict transmission of at least a subset of the contact data."

Should read (Claim 10 – Column 29):
-- 10. The computer readable apparatus of claim 6, wherein the authorization message comprises at least one restriction, where the at least one restriction is configured to restrict transmission of at least a subset of the contact data. --

Currently reads (Claim 11 – Column 29) Lines 34-35:
"11. The computer readable apparatus of claim 5, wherein the at least one restriction is specified by the third party."

Should read (Claim 11 – Column 29):
-- 11. The computer readable apparatus of claim 6, wherein the at least one restriction is specified by the third party. --

Currently reads (Claim 12 – Column 29) Lines 36-39:
"12. The computer readable apparatus of claim 5, wherein the transmission of the third party's contact information from the third party's client device further comprises a modification of the contact information by the third party."

Should read (Claim 12 – Column 29):
-- 12. The computer readable apparatus of claim 6, wherein the transmission of the third party's contact information from the third party's client device further comprises a modification of the contact information by the third party. --